United States Patent [19]

Vinas I Nogueroles

[11] Patent Number: 4,869,661
[45] Date of Patent: Sep. 26, 1989

[54] MACHINE FOR THE PRODUCTION BY CONTINUOUS ROLLING OF A MASS OF DOUGH FOR BAKERY PRODUCTS AND BUNS AND ROLLS

[75] Inventor: José M. Vinas I Nogueroles, Mataro, Spain

[73] Assignee: Sermont, S.A. and Construcciones Mecanicas AGMI, S.A., Barcelona and Mataro, Spain

[21] Appl. No.: 66,237

[22] Filed: Jun. 25, 1987

[30] Foreign Application Priority Data

Jun. 25, 1986 [ES] Spain ..................................... 556955

[51] Int. Cl.$^4$ ............................ A21C 3/02; A21C 1/08
[52] U.S. Cl. ...................................... 425/230; 366/69
[58] Field of Search ................. 426/502; 425/371, 372, 425/230, 225, 227, 231

[56] References Cited

U.S. PATENT DOCUMENTS

| | | | |
|---|---|---|---|
| 1,479,140 | 1/1924 | Kennedy | 425/364 |
| 1,949,105 | 2/1934 | Lauterbur et al. | 426/498 |
| 2,357,085 | 8/1944 | Cohen et al. | 426/502 |
| 2,728,307 | 12/1955 | Rhodes | 425/324.1 |
| 3,191,553 | 6/1965 | Rich et al. | 425/372 |
| 3,973,895 | 8/1976 | Hayashi | 425/372 |
| 4,113,412 | 9/1978 | Hayashi | 425/372 |
| 4,178,147 | 12/1979 | Hayashi | 425/372 |
| 4,192,636 | 3/1980 | Hayashi et al. | 425/373 |
| 4,266,920 | 5/1981 | Hayashi et al. | 425/502 |
| 4,421,776 | 12/1983 | Brinkers et al. | 426/502 |
| 4,435,144 | 3/1984 | Kemper | 425/371 |
| 4,692,107 | 9/1987 | Morikawa et al. | 425/371 |
| 4,692,110 | 9/1987 | Hayashi | 425/372 |

FOREIGN PATENT DOCUMENTS

| | | |
|---|---|---|
| 0056499 | 7/1982 | European Pat. Off. . |
| 0140458 | 5/1985 | European Pat. Off. . |
| 2122214 | 8/1972 | France . |
| 2261707 | 9/1975 | France . |
| 766262 | 1/1957 | United Kingdom ................. 425/371 |

*Primary Examiner*—Willard Hoag
*Attorney, Agent, or Firm*—Cushman, Darby & Cushman

[57] ABSTRACT

Apparatus for rolling dough including an elevated feeder conveyor and cooperating feed roll followed by a lower conveyor having a continuous belt pivoted at one end and spaced above the lower conveyor for rolling and beating the dough on the lower conveyor.

4 Claims, 4 Drawing Sheets

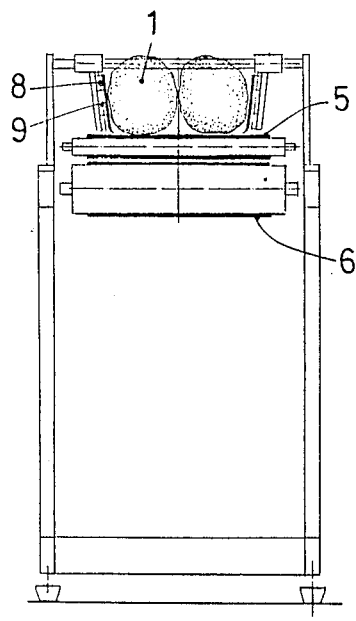
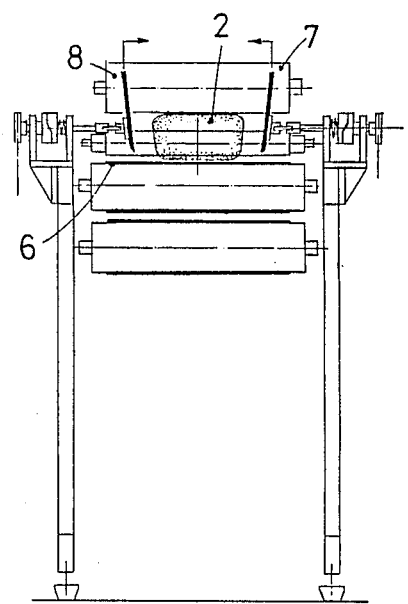

MACHINE FOR THE PRODUCTION BY CONTINUOUS ROLLING OF A MASS OF DOUGH FOR BAKERY PRODUCTS AND BUNS AND ROLLS

It is known that in methods used for making bakery products and buns and rolls the mass of dough must be rolled before the various shaping phases required for obtaining the various products are carried out. This rolling process consists basically of obtaining from a mass of shapeless dough a sheet or strip of this material of reduced thickness.

Traditionally this rolling process has been carried out by forcing the mass of dough through the space determined by two surfaces, both of which may be cylindrical, one of them cylindrical and the other flat etc. One of the types of machine most commonly used has been that commonly known as a rolling machine, i.e. a machine in which rolling is carried out by making the mass of shapeless material pass through the space defined by two cylindrical rollers arranged with their axes in a parallel position and relatively close to each other to obtain a sheet of thickness which is exactly the same as the distance apart of these rolls. This rolling process can be carried out in different ways and using different types of machine, whereby the rollers may have surfaces which are smooth, rough formed with rods etc.

In all these known cases, however, the rolling of the mass of dough is effected by making it pass through two surfaces with a small clearance between them and in which it is squeezed resulting in changes in its qualities and characteristics; this makes it necessary in many cases to give a further treatment to the sheet of dough obtained so that it can be handled subsequently.

The process and machine which are the subject of this patent relate to a system for obtaining a continuous sheet of dough which has the special advantage that the characteristics and qualities of the mass of dough remain unchanged during the process to which it is subjected so that it is not necessary subsequently to regenerate the sheet of dough obtained so that it recovers its original characteristics and it is possible to bake it directly after cutting or shaping.

The process covered by this patent consists basically of subjecting the mass of dough from which it is desired to obtain the sheet or strip to a progressive beating or striking action which results in a reduction in the thickness also of a progressive nature of the mass of dough until a sheet or strip of the desired thickness is obtained.

By regulating the striking action in combination with the speed and frequency of the movements to which the mass of dough is subjected it is possible to obtain a regulation of the manufacturing phases which is suitable for all requirements in relation to the type of dough used, the thickness of the sheet to be obtained etc.

As the qualities of the mass of dough remain unchanged during the process it is possible for example to obtain a sheet of dough for making products of the puff pastry type, for which it is necessary that the dough contain a certain quantity of fat.

Inorder to obtain a better understanding of the general characteristics involved in this process and the corresponding machine for the production by continuous rolling of masses of dough for bakery products and buns and rolls covered by this patent, some descriptive drawings are attached to this description in which a diagram of the process is shown together with an embodiment of a machine which is suitable for carrying out this process according to the principles of the claims, a special feature of these illustrations being that they must be considered in a broad and general sense without their being considered restrictive in any way as they are of a purely informative nature.

BRIEF DESCRIPTION OF THE DRAWINGS

FIGS. 5 and 6 are sections through the planes marked V—V and VI—VI in FIG. 3 showing the configuration which the mass of dough takes on in the loading phases before being treated by the process covered by this patent and before the striking phase is initiated to which it is subjected to obtain the corresponding sheet respectively.

Figure 1:
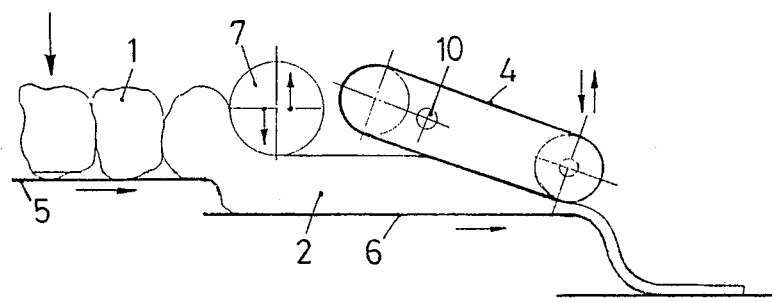
FIGS. 1 and 2 are schematic views in which the process of forming the mass of dough into the corresponding strip is shown.
Figure 2:
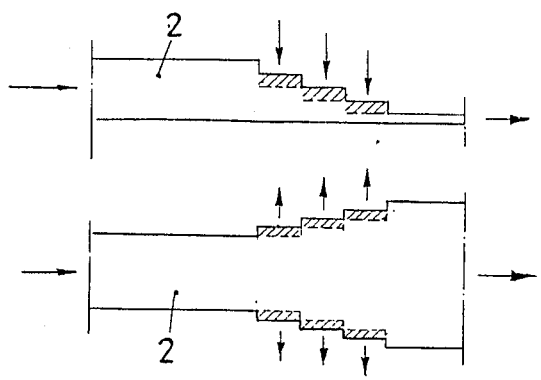
Figure 3:
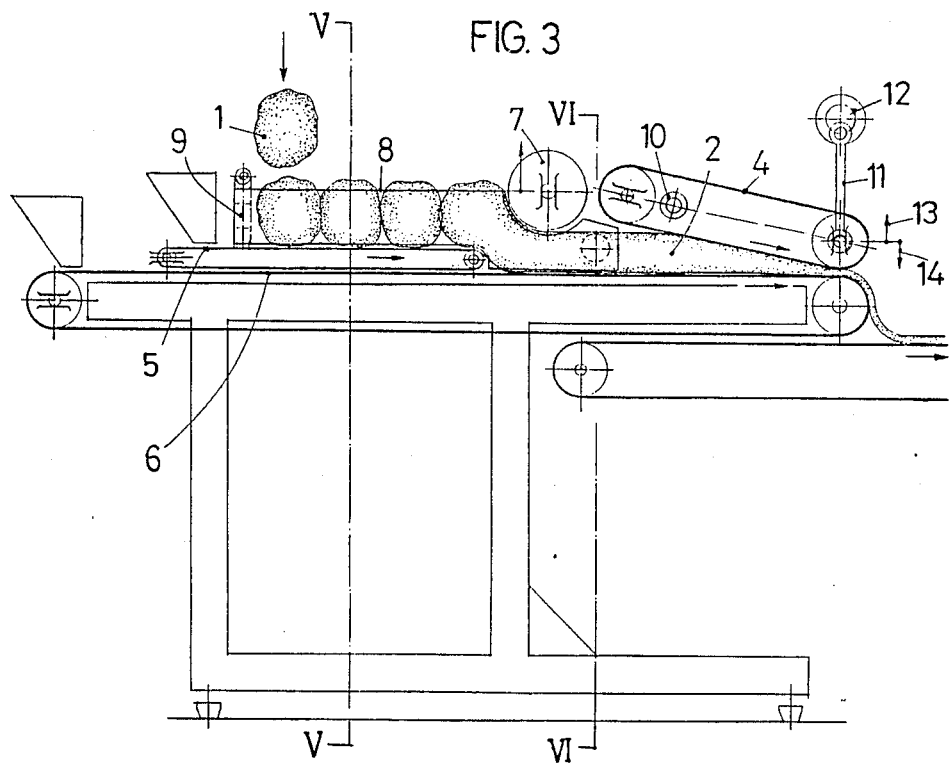
FIG. 3 shows an elevational view of the machine designed to carry out the process covered by this patent, whilst
Figure 4:
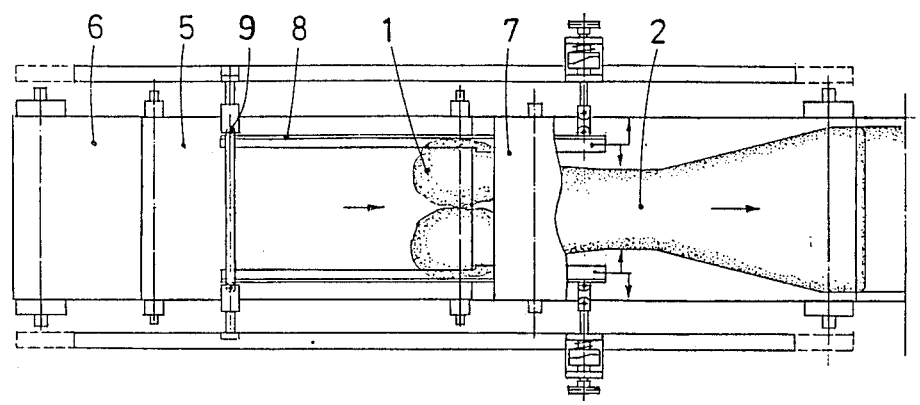
FIG. 4 shows a plan view of it.

Numbers have been given in the figures related to the descriptions given below to make it easier to locate the various phases of the process and parts of the machine used, covered by this patent Thus it will be seen from the illustratons that the process covered by this patent consists of the following phases:

First of all from a number of lumps -1- of a mass of dough of irregular shape wihich are deposited on a moving surface a continuous strip -2- of constant thickness is obtained which is deposited on another moving surface. This continuous strip of continuous dough is then straightway subjected to an intermittent horizontal movement as well as to a beating action in the periods when the mass is not moving. This beating action is carried out in such a way that the component which compresses the mass of dough is constantly lowered further as the mass moves forward so that its thickness is constantly reduced progressively, FIG. 2 shows in diagrammatic form the successive compression phases to which an infinitesimal portion of dough mass is subjected during each period and from which it will be seen that the mass of dough is obtained progressively. As the compression to which the dough is subjected is not abrupt, its qualities and characteristics remain unchanged.

The volume of the mass of dough which is compressed expands laterally with the result that as the thickness of the strip is reduced, its width increases.

In FIGS. 3 to 6 the machine covered by this invention consists of a conveyor belt -5- which conveys the masses of shapeless dought -1- to a second conveyor belt -6- located below the first one and in the entry zone of which a revolving roller -7- is located which regulates the passage of the mass towards the conveyor belt -6-. Two vertical blades -8- are arranged above the conveyor belt -5-; they are fitted with some rotary shafts -9- which are also vertical and by means of which a lateral displacement or sweeping movement can be effected over the conveyor belt -5- which helps to convey the masses of dough -1- which are located on this belt as well as to clean the surface of the conveyor belt.

Another conveyor belt -4- is located in an inclined position above the conveyor belt -6- and after the roller -7- in such a way that its nearest zone to the belt -6- is the nearest to the outlet zone, which is provided with a horizontal rotary shaft -10- and which in combination with the connecting rod -11- and the eccentric -12- gives the conveyor belt an alternting movement as shown by arrows -13- and -14- which produces a beating effect on the mass of dough -2- arranged over the conveyor belt -6-, which compresses the strip of dough -2-.

The process carried out by the machine consists of the conveyor belt -5- moving the masses of dough -1- to the outlet zone, where the roller -7- regulates the quantity of dough supplied to the belt -6-, where applicable a detection system being provided which causes the movement of the conveyor belt -5- to be interrupted, when an accumulation of dough occurs at the entry of the belt -6-. The conveyor belt -6- moves the strip of dough -2- linearly, interrupting the movement when the conveyor belt -4- strikes the mass of dough arranged over the belt -6-; at the same time the translational movement of the conveyor belt -4- also ceases.

Anything that does not affect, alter, change or modify the essence of the process described, shall be variable for the purposes of this patent limited only by the claims.

I claim:

1. A machine for the production by continuous rolling of a mass of dough for bakery products, buns and rolls, comprising:

conveying means for conveying dough along a conveying path;

roller means mounted along said conveying path, vertically above said conveying means for regulating the amount of dough conveyed by said conveying means;

means for beating dough conveyed on said conveying means mounted along said conveying path downstream of said roller means to compress the dough into a continuous strip of reduced thickness, said means for beating including a beating member mounted vertically above said conveying means so as to define a gap therebetween that decreases in the direction of conveyance, said beating member being pivotally mounted at one longitudinal end thereof and operatively coupled at the other longitudinal end thereof to a means for reciprocally moving said other end toward and away from said conveying means to intermittently urge at least a portion of said beating member into compressing contact with dough disposed on said conveying means.

2. A machine as in claim 1, wherein said conveying means comprise first and second conveyors, said first conveyor being mounted upstream of and spaced vertically upwardly relative to said second conveyor, said roller means being mounted adjacent a juncture of said first conveyor and said second conveyor for regulating the amount of dough conveyed from the first conveyor to the second conveyor.

3. A machine as in claim 1, wherein said beating member comprises a conveying belt mounted vertically above said conveying means and mounted at the other longitudinal end thereof to a connecting rod and eccentric cam means for reciprocally moving said connecting rod towards and away from said conveying means so as to reciprocally move said conveying belt into and out of compressing contact with dough dispersed on said conveying means.

4. A machine as in claim 1, further comprising first and second vertical blade elements mounted adjacent said conveying path, vertically above said conveying means and upstream of said rolling means, so as to have a longitudinal axis thereof parallel to a longitudinal axis of said conveying path, said blades being mounted for lateral displacement for selectively scraping the surface of said conveying means.

* * * * *